United States Patent [19]

Gale

[11] Patent Number: 4,662,080

[45] Date of Patent: May 5, 1987

[54] PANEL MEASURING AND LAYOUT TOOL

[76] Inventor: Edward R. Gale, Buxton School, Stone Hill Rd., Williamstown, Mass. 01267

[21] Appl. No.: 815,898

[22] Filed: Jan. 3, 1986

[51] Int. Cl.[4] ............................ G01B 5/00; G01B 5/14
[52] U.S. Cl. ........................................ 33/528; 33/666
[58] Field of Search ................. 33/1 G, 175, 189, 456, 33/528, 562, DIG. 10

[56] References Cited

U.S. PATENT DOCUMENTS

| 82,214 | 9/1868 | Ferren | 33/175 |
|---|---|---|---|
| D. 136,978 | 1/1944 | Tomasini | 33/175 |
| 386,033 | 7/1888 | Reeves | 33/456 |
| 397,132 | 2/1889 | Kimball | 33/175 |
| 422,104 | 2/1890 | Yount | 33/180 R |
| 1,544,107 | 6/1925 | Sharples | 33/175 |
| 2,221,872 | 11/1940 | King et al. | 33/456 |
| 2,334,395 | 11/1943 | Cooper | 33/175 |
| 3,861,049 | 1/1975 | Muller | 33/175 |
| 4,423,555 | 1/1984 | Wootten | 33/528 |

FOREIGN PATENT DOCUMENTS 248983  1/1970  U.S.S.R. ............................ 33/189

Primary Examiner—Richard R. Stearns
Attorney, Agent, or Firm—Schmeiser, Morelle & Watts

[57] ABSTRACT

A measuring tool for laying out plane geometries by firmly fixing extendable legs with marking or indexing means in a configuration conformable to desired layouts. Once properly configured, the invention is physically transferred to a planar work piece and indices are transferred to the work piece, thus accomplishing transfer of measurements simply and without the use of rules or scales.

2 Claims, 3 Drawing Figures

PANEL MEASURING AND LAYOUT TOOL

BACKGROUND AND OBJECTS OF THE INVENTION

The present invention relates generally to that class of tools which are used to measure and lay out flat panelings such as wallboard, sheetrock, and the like; and, more particularly to a new and useful improvement in adjustable plane geometry measuring devices.

As is well known to those tradesmen who work with planar materials such as wallboard, sheetrock, plywood and other large flat surfaces which must be specially cut or configured for installation, it is customary to make several tedious and oftentimes redundant measurements before a piece is measured, cut and placed into its proper position. Generally, measurements are first taken with a carpenter's tape or measuring device and then transcribed to a work piece after assuring that the proper indices have been obtained. In addition to the measuring tape, other tools are usually employed including the square and some form of marking medium such as pencil, chalk or a line scribber. Frequently, a large surface or involved measurement may require the assistance of an apprentice or other helper.

After the area to be covered has been measured, indices placed on the work piece, and measurements transferred thereto (layout), only the task of cutting and placing the work piece in its proposed position remains. These latter tasks rarely require the efforts of a skilled tradesman. Therefore it is readily seen, that the measuring and layout tasks are by far the more intricate, require more time, and oftentimes involve more people than does the physical act of fabrication, i.e. assembly.

Such difficulties in measuring and layout not only plague the carpenter, a part of whose work has been described in the foregoing, but other workers such as roofers, electricians, stone masons and drillers. All of these tradesmen, at various times in their occupations, require means for rapidly and economically sizing and laying out flat surface areas. Somtimes they are concerned with determining the geometry of a flat surface area relative to a known index; while at other times, knowing the geometry, they may wish to locate a reference point or smaller areas (cut-outs) somewhere within the bounds of that geometry.

It would seem then, that important advantages might be obtained employing the concept of a light, easily managed and simple tool which could be used to both measure and directly lay out the necessary geometries on planar materials.

It is therefore an object of this invention to provide a tool for measurement and layout of planar surfaces which would embody measuring and layout concepts obtainable conventionally only through the use of a plurality of tools.

Another object of this invention is to provide a simple tool which will relieve the user from the requirement of making numerous and exacting measurements.

Another object of this invention is to provide a tool which can be easily handled by a single person.

A further object of this invention is to provide a tool which can be operated rapidly and with no sacrifice of accuracy.

The objects and advantages of this invention, havng been set forth in part herein, shall become obvious from this reading, or may be learned by practice with the invention.

SUMMARY OF THE INVENTION

It has been found that the objects of this invention may be realized by making a device with at least four telescoping legs which extend outwardly from a central member. The central body member is comprised of two opposing plates which are connected through a central shaft member which can be rotated by a handle affixed at one end. Each leg, mounted on the shaft, and between said plates, can rotate at least through 90 degrees in the same plane as the plates. In the preferred embodiment, the shaft is threaded and has at one end a handle; while at the other end, having engaged and passed through a threading in the top plate, it is captured in the bottom plate. By rotating the handle, the plates are brought together firmly, by a screwing action, thus snubbing the leg members between them. This mechanism allows the base to be indexed or situated in a reference location and the telescoping legs to be oriented toward key points or indices of an area to be measured. In addition, at the end of the telescoping legs are sharp points for making corner marks. In one variation, it is anticipated that sharp points or studs may be placed in the base of the invention so as to affix it to a frame member or layout index. Such sharp points or studs, if not desired on the base member itself, may be placed on extensions or reference tabs which protrude from the base member. The base plate, central shaft, and telescoping legs may be made from any rigid or otherwise suitable materials such as aluminum or plastic.

It should be understood that the foregoing general description and the following detailed description are exemplary as well as explanatory of the invention, but are not restrictive thereof. Thus, while the preferred embodiment given herein describes a singular tool (having two plates, one of which is moveable and the other fixed; employing a threaded shaft which is seated in a threaded aperture of the top plate, and is rotated by hand; and having no more than four legs), the concept is itself particularly adaptable to may modes of mechanization. Among these modes are: the use of a large base plate having thereon several smaller snubbing plates which secure a plurality of telescoping legs so as to be useful on very large plane geometries; and, a large base plate having therein several apertures for receiving smaller snubbing plates' shafts, said shafts having telescoping legs mounted thereon, allowing a selective shaft-leg positioning and thereby conformity to unusual plane geometries.

The accompanying drawings referred to herein and constituting a part hereof, illustrate the preferred embodiment of the invention as well as an alternate embodiment, and together with the description, serve to explain the principles of the invention.

DESCRIPTION OF THE PREFERRED EMBODIMENTS

Figure 1:
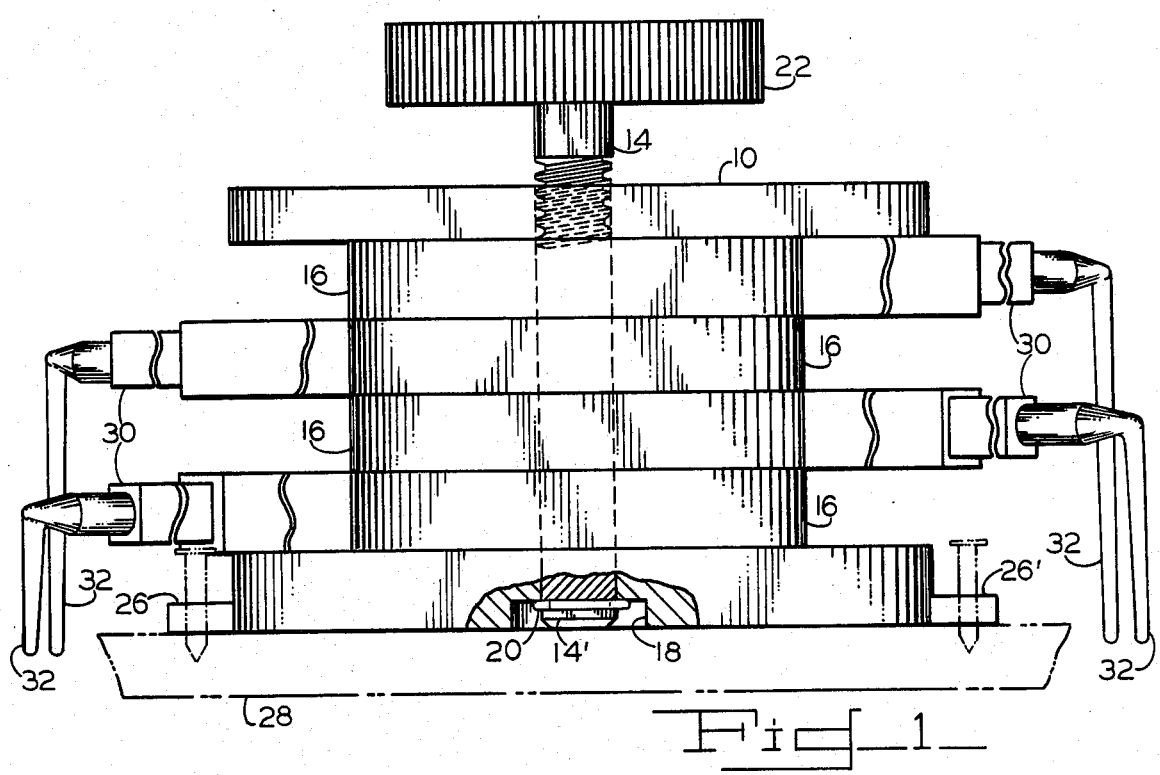
FIG. 1 is a sectional side view, in elevation.
Figure 2:
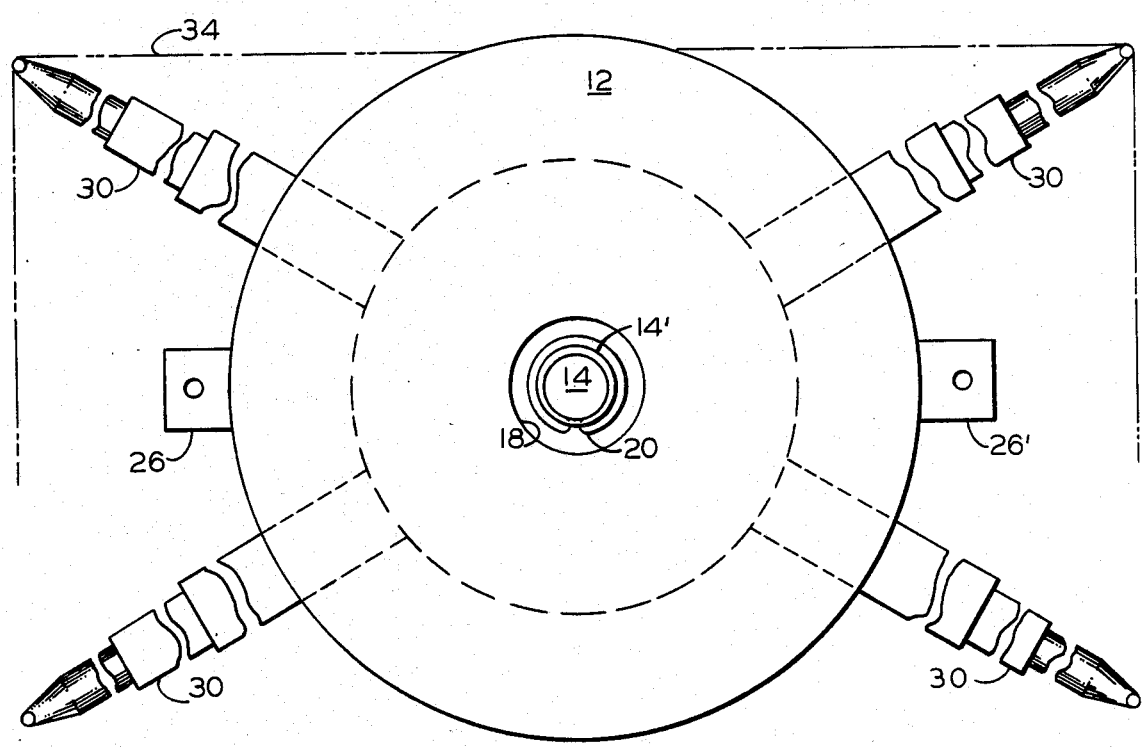
FIG. 2 is a bottom view with partial cutaway of the shaft flange, depicting the retaining "C" ring clip.

Referring now more particularly to FIGS. 1 and 2 of the accompanying drawings, there is illustrated a conventional and preferred embodiment of the subject invention. In FIG. 1, a first or upper plate 10 is connected to a lower, or base plate 12 by means of a threaded shaft 14. The upper plate 10 is threaded to receive shaft 14 while the base end 14' of the shaft is flanged and is secured in base plate 12 recess 18 by a "C" ring clip 20. Interposed between plates 10 and 12 and mounted on the shaft 14 through base end holes are the various legs 16 of the device. A handle 22 is provided in this embodiment at the top of the shaft in order to allow the application of rotational force. To aid in the alignment and indexing of the tool, base plate 12 projections or reference tabs 26, 26' are provided with holes so that the invention might be secured with nails to a frame member.

FIG. 2 specifically depicts the bottom view of the shaft 14, and, shaft flanges 14' protruding through recess 18 with emplacement of "C" ring clip 20.

FIG. 1 further illustrates the invention in place for obtaining measurements. The invention is secured to stud 28 by emplacement of nails through reference tabs 26, 26'. Upper plate 10 is lightly turned down by rotation of shaft 14 so as to slightly snub legs 16, reducing their mobility. The legs 16 are then rotated to the proper azimuth and extensions 30 are drawn out so that index pins or points 32 define the desired geometry as depicted by the layout locus 34 (see FIG. 2). Once the layout reference or locus 34 is established, handle 22, or alternative means, is actuated so that plates 10 and 12 are brought together tightly. Once tightened, the invention may be loosened from its constraints at reference tabs 26, 26', and removed from the framing stud 28.

The invention can now be placed onto the planar work surface and points 32 set or used to mark the desired layout. If the desired layout differs from the work piece geometry, i.e., square, the user has but to connect the reference markings left by pins 32 in order to obtain the desired cutting lines. It can readily be seen tht four legs are sufficient for laying out most quadrilateral shapes. It is conceivable that devices having more than four legs might be useful in laying out non-quadrilateral or irregular shapes.

Figure 3:
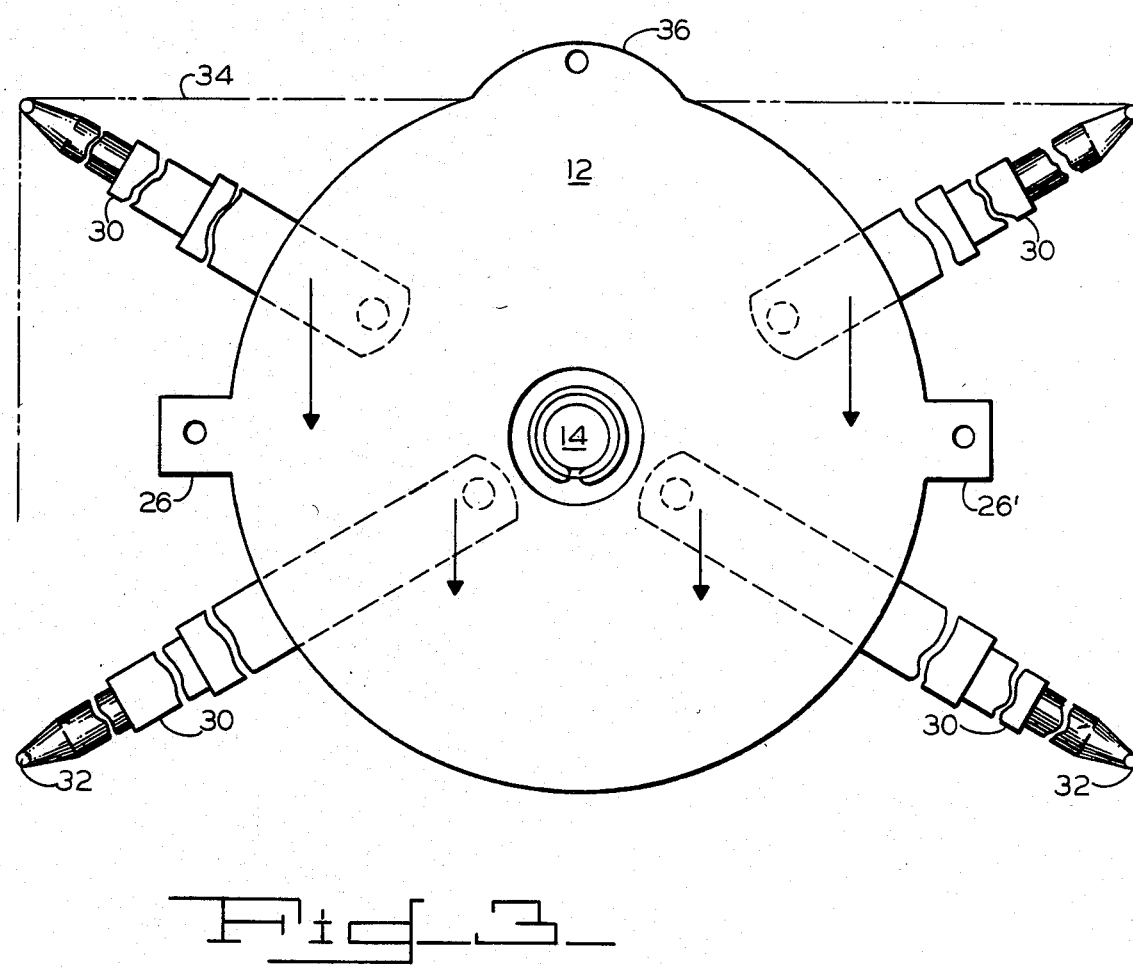
FIG. 3 is a bottom view of an alternate embodiment.

FIG. 3 shows an alternate embodiment wherein the legs are non-centrally attached by pivotally mounting them on pins 27 which project upwardly from the base plate; and all rotate in the same plane. Although full 360 rotation for each leg is not possible in this embodiment the legs are secured in an offset pattern which allows all of the legs to be directed to one side as shown by the arrows. This allows the tool to be more compact and enables each leg to be rotated independently without the possibility of moving the other legs due to friction. Also, since the legs move in the same planne the pins may all be the same size. However, as in the preferred embodiment the pins extend below the plane of the base plate 12 so that when the legs are extended there is pressure urging the pins into the workpiece. It is also possible to shape the pin points 32 as right angles for greater ease in marking the corners. In addition to the reference tabs 26 and 26' there may also be another reference tab 36 which has an annular opening and extends from the base plate. This reference tab 36 enables the user to secure the tool at only one place should that be necessary.

It should be recognized that the invention in its broader aspects is not limited to the specific embodiments herein shown and described, but departures may be made therefrom within the scope of the accompanying claims without departing from the principles of the invention and without sacrificing its chief advantages. For example, shaft 14 need not be threaded. It is only necessary that the operator apply a force on plate 10 so as to bring it firmly down on leg ends 16, against plate 12. As those versed in force application arts can readily contemplate, a number of force applying and levering methods might be used.

What is claimed is:

1. A measuring tool for laying out planar geometry comprising:
    a base member further comprising two opposing independent plates, a top plate and bottom plate, held in registry only by a singular central shaft which is rotatably set in said bottom plate and which functions in a manner so as to allow the drawing of said plates firmly together when a force, acting through said shaft, is applied to said base member;
    a plurality of telescoping legs mounted between said plates each leg having an end, called a fixable end, which has a hole therethrough, said hole capable of receiving a shaft means about which said leg may rotate when mounted and further comprising a non-fixable end bearing thereon an index pin which extends below said bottom plate; and
    force application means to act through said shaft thereby drawing said plates snugly together.

2. The invention of claim 1 wherein said force application means further comprises said shaft having threads over a portion thereon to engage threads within said top plate, whereby rotating said shaft will cause said top plate to be urged toward or away from said bottom plate.

* * * * *